United States Patent [19]

Blaiklock et al.

[11] 4,090,094
[45] May 16, 1978

[54] FLASHER SWITCH WITH OUTAGE INDICATION

[75] Inventors: William Musgrave Blaiklock, Dundas; Ronald Sherwin John Korody, Burlington, both of Canada

[73] Assignee: Tridon Limited, Burlington, Canada

[21] Appl. No.: 761,775

[22] Filed: Jan. 24, 1977

[51] Int. Cl.² .................... H01H 47/14; H01H 51/34
[52] U.S. Cl. .................... 307/132 M; 307/10 LS; 340/79; 340/251
[58] Field of Search ............... 307/132 M, 10 LS, 99, 307/132 R; 340/75, 80, 81 R, 251; 318/7; 315/83

[56] References Cited

U.S. PATENT DOCUMENTS

| 3,247,402 | 4/1966 | Hayden | 307/132 M |
| 3,618,011 | 11/1971 | Leeder | 340/80 |
| 3,789,232 | 1/1974 | Wareing | 307/10 LS |

*Primary Examiner*—L. T. Hix
*Assistant Examiner*—Stafford D. Schreyer
*Attorney, Agent, or Firm*—Hirons & Rogers

[57] ABSTRACT

A flasher switch of the type for flashing automobile lamps is provided with outage indication consisting of a split capacitor or two parallel capacitors connected in series with one of two coils producing opposed magnetic forces in a core controlling the operation of the switch armature. The contacts controlled by the armature are held closed by discharge of the capacitors through the coil. Upon detection of a decrease in current being flashed below a predetermined value one of the capacitors is prevented from discharging, thereby abruptly increasing the flashing rate.

3 Claims, 1 Drawing Figure

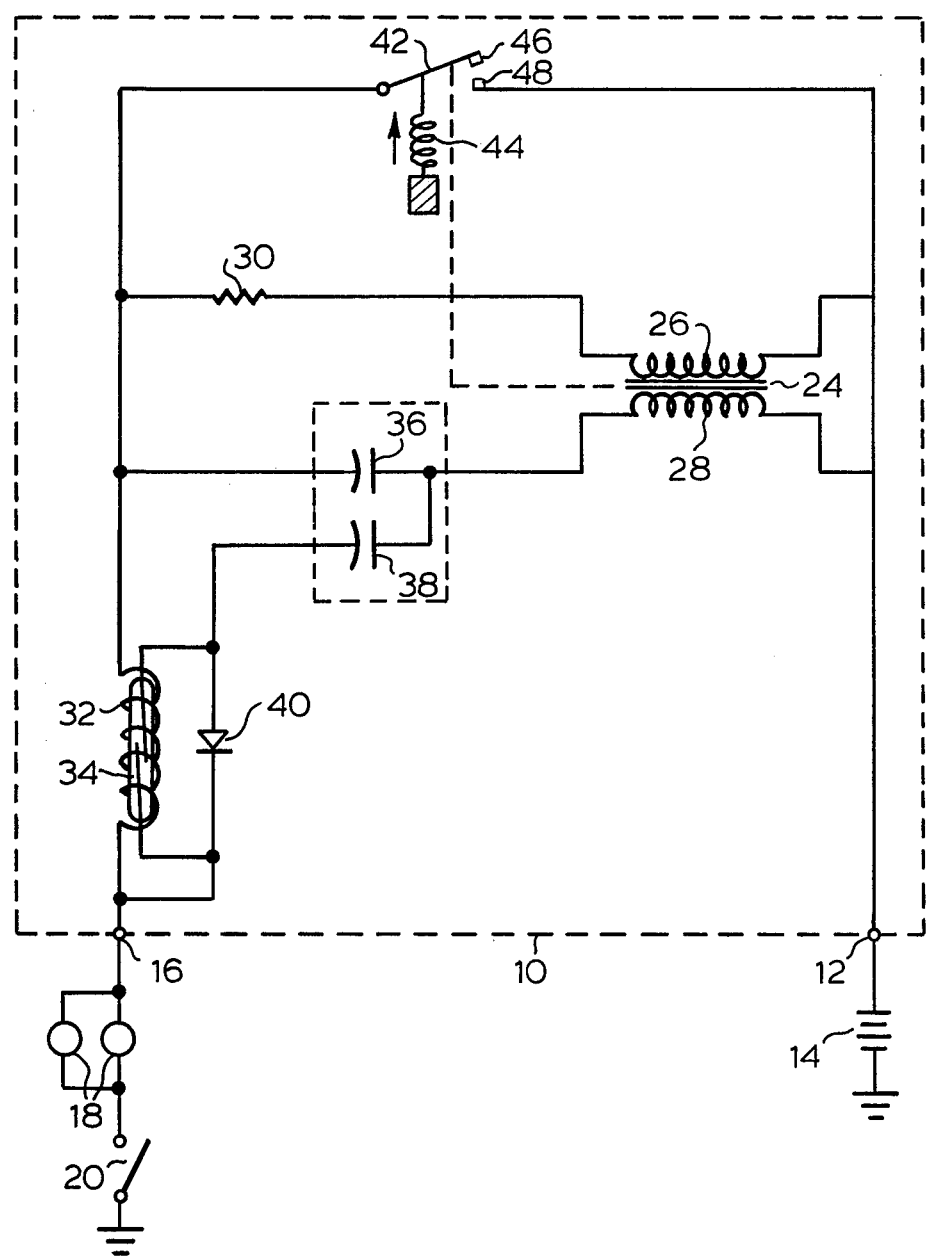

FLASHER SWITCH WITH OUTAGE INDICATION

FIELD OF THE INVENTION

The present invention is concerned with improvements in or relating to flasher switches, such as are used in automobiles for flashing the signal lights thereof, and especially to such switches with outage indication, i.e. providing automatically to an observer an indication that one or more of the lamps controlled by the switch is not operating.

REVIEW OF THE PRIOR ART

A number of proposals have been made hitherto for flasher switches with outage indication, for example in U.S. Pat. Nos. 2,743,401; 2,844,814; 3,421,143; 3,487,358; 3,618,011; 3,636,511 and 3,643,246. These switches usually include a current measuring arrangement which measures the maximum current flowing in the lamps being flashed, and provides an audible and/or visible signal upon a decrease in current caused by failure of one or more lamps.

There is disclosed and claimed in U.S. Pat. No. 3,247,402, issued 19th Apr., 1966 to Tridon Ltd. a flasher switch wherein a pair of parallel-connected coils are wound on a core to produce opposed magnetic fields, with a capacitance connected in series with one of the coils. Upon supply of current to the switch the fields of the coils oppose one another until the capacitor is charged whereupon the switch closes and the lamps light. Upon closure of the switch the coils are shorted and the capacitor discharges through its coil, this discharge holding the switch closed for a predetermined "on" period. The switch then opens and the cycle repeats.

There is disclosed and claimed in U.S. Pat. No. 3,789,232, issued 29th Jan. 1974, and assigned to Tridon Ltd., a flasher switch of the type to which U.S. Pat. No. 3,247,402 is directed in which outage indication is obtained by inserting an impedance into the circuit, or removing it therefrom, so as to produce an appreciable change of flux in the core, preferably so as to indicate lamp outage by an increase in the flashing rate. The disclosures of both of these prior specifications are incorporated herein by reference. It has been found that these changes in core flux introduce manufacturing difficulties in maintaining adequate stability under commercial production conditions, as will be explained hereinafter.

DEFINITION OF THE INVENTION

As with any other industrial product there is a constant thrust to provide a switch having advantages over the prior constructions as to performance within the standards laid down for such switches, reliability, care and cost of manufacture, etc.

It is therefore an object of the present invention to provide a new flasher switch having certain advantages over those disclosed in the above-mentioned U.S. Pat. No. 3,789,232.

In accordance with the present invention there is provided a flasher switch with outage indication comprising, a pair of switch terminals, a magnetisable core, first and second operating coils on the core and connected in parallel between said switch terminals to be supplied in parallel with current from a D.C. power source connected between said switch terminals and to produce in the core upon such supply of current substantially equal opposed magnetic forces, a contactor, biasing means for the contactor, the contactor being movable in one direction from a first to a second position in response to energization of the core by a magnetic force of one of the operating coils and movable in the opposite direction from the second to the first position under the action of the said biasing means, first and second capacitors connected in series with the second coil to be charged by current passing through the second coil whereby upon discharge of at least the first capacitor through the second coil it causes energization of the core sufficient for maintenance of the contactor in the said second position, a movable contact moved by the said contactor, another contact engaged by the said movable contact when the contactor is in the said second position, shortcircuit means comprising the contactor establishing a shortcircuit across the capacitors and the second coil when the movable and another contacts are engaged, and a current detector connected to detect the magnitude of the current flowing between said movable and another contacts when engaged and responsive to a decrease of said current below a predetermined level to prevent discharge of the second capacitor through the second coil to thereby increase the switch flashing rate.

DESCRIPTION OF THE DRAWINGS

Particular preferred embodiments of the invention will now be described, by way of example, with reference to the accompanying schematic circuit diagram.

DESCRIPTION OF THE PREFERRED EMBODIMENTS

The flasher switch comprises the elements enclosed within the broken line 10, which therefore represents the case or enclosure for the switch. The switch is connected via a terminal 12 to a source 14 of D.C. power, and via a terminal 16 to the lamps 18 that are to be flashed by the switch with power from the source, an on/off switch 20 being interposed between the lamps and ground. These terminals 12 and 16 also constitute the end terminals for various current paths through the switch, as will be described below.

A magnetisable switch core 24 carries two equal parallel wound coils 26 and 28 of relatively high resistance (e.g. about 100–200 ohms each), the coils being arranged to provide opposing magnetic fields upon energisation. The coil 26 has one end connected to terminal 12, while the other end is connected through a low resistance resistor 30 and the operating winding 32 of a reed switch 34 to the terminal 16. The coil 28 also has one end connected to the terminal 12, while the other end is connected via a capacitor 36 to the junction of resistor 30 and winding 32. The coil 28 other end is also connected via another capacitor 38 and a diode 40 to the terminal 16, the diode having the normally-open contacts of the reed switch connected in parallel therewith, so that closure of the contacts will short the diode.

A mechanical armature 42 of the switch is moved by the magnetic field of core 24 against the urge of spring 44 and carries a moving contact 46 engagable in closed condition with fixed contact 48, the spring 44 urging the contacts to the open condition. Either of the coils 26 and 28 can when energised produce a magnetic field of sufficient strength to move the armature 42 to close the contacts 46 and 48, and also to hold the contacts closed. It will first be assumed that all of the lamps 18 to be flashed are operative, so that current flows through the"

switch above a predetermined level upon closure of the switch 20, which will usually be the direction-indicator switch of an automobile.

The contacts 46 and 48 are open and the current applied to the switch flows through both coils equally, producing equal and opposite fields which cancel one another, so that the armature 42 is not moved. The capacitors 36 and 38 are both charged by the current flowing through them. The current passing through the reed switch winding 32 is sufficient to close the contacts thereof, so that the diode 40 is shunted and effectively not in circuit, the capacitor 38 charging through the closed switch contacts. As the capacitors 36 and 38 become charged the field produced by the winding 28 decreases until at some point the field of the winding 26 is able to move the armature 42 and close the contacts 46 and 48, whereupon the lamps 18 light.

The armature 42 is now short-circuiting the windings 26 and 28, and the field in winding 26 collapses almost immediately in a time controlled by the value of the resistor 30. The capacitors 36 and 38 now discharge through the winding 28 and produce a field that maintains the contacts 46 and 48 closed for a period determined by the circuit values, until the spring 44 is able to overcome the force produced by the field in the winding 28 and open the contacts. With the contacts 46 and 48 closed, and all the lamps 18 operative, the current through the reed switch winding is sufficiently high that its contacts are closed and shortcircuit the diode 40, which would otherwise prevent discharge of the capacitor 38. Upon opening of the contacts 46 and 48 the lamps go out and the cycle repeats with the normal desired flash rate.

The period taken for the main contacts 46 and 48 to close after the switch 20 is closed constitutes the "off" part of the switch duty cycle, while the period that they are closed constitutes the "on" part of the same cycle. The operating requirements for such a switch for vehicle direction indicators are now substantially standardised and typicallyit should produce about 90 flashes per minute, with the lamps in their lighted condition for about 50% of the time. The operating requirements of a switch in accordance with the invention can be adjusted, as will be apparent to those skilled in the art, by suitable choice of the values of the various mechanical and electrical switch components. Such switches as disclosed in U.S. Pat. Nos. 3,247,402 and 3,789,232 permit ready achievement of a duty cycle of about 50%, and the duty cycle is not affected by the value of the current load being flashed.

The reed switch coil 32 constitutes a current measuring detector that is operative when the current flow falls below a predetermined lower level. Such a lower level most usually will be obtained because one or more of the lamps 18 has burned out and is not drawing current, but it may also result from a general deterioration in the conductivity of the lamps and the associated circuit from aging and corrosion. If upon closing of the contacts 46 and 48 the current flow in the winding 32 is below the predetermined level the contacts of switch 34 remain open and only the capacitor 36 can discharge; the capacitor 38 cannot now discharge because of the operation of diode 40, and this abruptly decreases the amount of energy available to flow through the winding 28 as well as increasing the rate of discharge through the winding. The result of both these effects is to more abruptly decrease the magnetic field available from the core 24 to oppose spring 44 so that the contacts 46 and 48 open after a much reduced "on" period, resulting in an abrupt and marked increase in flashing rate, e.g. from about 90 per minute to about 160 per minute.

It will be seen therefore that a switch in accordance with the invention provides a completely positive and unmistakable indication of lamp outage without the need for expensive external indicators.

In prior art devices in which outage is indicated by a decrease of the flashing frequency this is also decreased progressively by the deterioration of the circuit conductivity over a lengthy period of time, so that an observer is not generally aware of the change that has taken place. It could happen therefore that a false outage indication was given when in fact all lamps were lighting, or alternatively one lamp had failed but the change in flashing frequency was not noted by an observer accustomed to a slower rate. This effect was sufficient to cause difficulty in design of such switches in order to try to ensure that they did not give such false indications. An abrupt increase in the flashing rate is however a positive and unmistakable indication that will immediately claim the attention of the observer.

It will be seen from a comparison of the circuit of this invention with that of our prior U.S. Pat. No. 3,247,402 that outage indication is effectively obtained by splitting the capacitor thereof into two separate components which could be a single capacitor element, of the same total value as the original capacitor, and adding the current level detector constituted in this embodiment by the reed switch 34. The added elements to obtain outage indication are substantially less than is required by the circuits disclosed in our prior U.S. Pat. No. 3,789,232, so that the resulting switch is less expensive. Moreover, the circuits disclosed in that patent involve the insertion of components that change the relative flux levels in the two windings 26 and 28, which changes the strength of the electromagnet constituted by the coils; relative flux levels are not altered in the circuit of this invention. Thus, the strength of the electromagnet must be within certain limits for its relay-operating function, and this is determined by the design of the coil, the armature, the coil wire thickness, etc., and in the circuits of the invention none of these parameters need be changed in changing the flashing rate.

It will be apparent to those skilled in the art that the current detector can be some circuit component other than a magnetic reed switch, provided it is effective above a predetermined current flow to shunt the diode and permit discharge of the capacitor 38. However, at the present time in commercial practice reed switches are the most economical for this purpose owing to the relatively large currents that are involved in switching automobile and truck lamps (e.g., from about 8 amps for a small car up to about 40 amps for a truck).

We claim:

1. A flasher switch with outage indication comprising, a pair of switch terminals, a magnetisable core, first and second operating coils on the core and connected in parallel between said switch terminals to be supplied in parallel with current from a D.C. power source connected between said switch terminals and to produce in the core upon such supply of current substantially equal opposed magnetic forces, a contactor, biasing means for the contactor, the contactor being movable in one direction from a first to a second position in response to energization of the core by a magnetic force of one of the operating coils and movable in the opposite direction from the second to the first position under the action of the said biasing means, first and second capacitors connected in series with the second coil to be charged by current passing through the second coil whereby upon discharge of at least the first capacitor through the second coil it causes energization of the core sufficient for maintenance of the contactor in the said second position, a movable contact moved by the said contactor, another contact engaged by the said movable contact when the contactor is in the said second position, shortcircuit means comprising the contactor establishing a shortcircuit across the capacitors and the second coil when the movable and another contacts are engaged, and a current detector connected to detect the magnitude of the current flowing between said movable and another contacts when engaged and responsive to a decrease of said current below a predetermined level to prevent discharge of the second capacitor through the second coil to thereby increase the switch flashing rate.

2. The invention as claimed in claim 1, wherein the said second capacitor has a diode connected in series therewith, and the said current detector comprises a magnetically controlled switch having an operating coil in the current flow path including the movable and another contacts and having switch contacts with the said diode connected therebetween, whereby the passage of load current in the operating coil above the predetermined value closes the contacts to shortcircuit the diode and permit discharge of the second capacitor, and the passage of load current below the predetermined value does not close the contacts so that the diode is connected in series with the second capacitor and prevents discharge thereof through the second coil.

3. The invention as claimed in claim 1, wherein said first and second capacitors are a single tapped capacitor.

* * * * *